United States Patent
Mertens et al.

(10) Patent No.: US 10,607,526 B2
(45) Date of Patent: Mar. 31, 2020

(54) METHOD FOR OPERATING A DISPLAY DEVICE OF A MOTOR VEHICLE

(71) Applicant: AUDI AG, Ingolstadt (DE)

(72) Inventors: Joris Mertens, Ingolstadt (DE); Georg Haslinger, Ingolstadt (DE); Jacques Hélot, Ingolstadt (DE); Markus Klug, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/317,301

(22) PCT Filed: Jul. 6, 2017

(86) PCT No.: PCT/EP2017/066910
§ 371 (c)(1),
(2) Date: Jan. 11, 2019

(87) PCT Pub. No.: WO2018/011047
PCT Pub. Date: Jan. 18, 2018

(65) Prior Publication Data
US 2019/0236999 A1    Aug. 1, 2019

(30) Foreign Application Priority Data
Jul. 12, 2016  (DE) .......... 10 2016 212 687

(51) Int. Cl.
*G09G 3/20*   (2006.01)
*B60K 35/00*  (2006.01)
(Continued)

(52) U.S. Cl.
CPC .......... *G09G 3/2003* (2013.01); *B60K 35/00* (2013.01); *G02B 27/01* (2013.01);
(Continued)

(58) Field of Classification Search
CPC .............. B60K 35/00; B60K 2370/12; B60K 2370/149; B60K 2370/1529;
(Continued)

(56) References Cited

U.S. PATENT DOCUMENTS

2013/0342568 A1    12/2013  Ambrus et al.
2016/0041386 A1*   2/2016   Rodriguez Moreno ...................
                                                G02B 27/0101
                                                345/7
2016/0247255 A1    8/2016   Staudenmaier et al.

FOREIGN PATENT DOCUMENTS

CN    104933977 A      9/2015
DE    199 11 648 A1    9/2000
(Continued)

OTHER PUBLICATIONS

Translation of international Preliminary Report on Patentability dated Jan. 17, 2019 from International Patent Application No. PCT/EP2017/066910, 11 pages.
(Continued)

*Primary Examiner* — Charles V Hicks
(74) *Attorney, Agent, or Firm* — Staas & Halsey LLP

(57) ABSTRACT

A first sensor device detects a viewing direction of a user, who is located in an interior of the motor vehicle, onto a display surface of a motor vehicle. A control unit of the motor vehicle determines a display parameter of a digital image subject to the detected viewing direction, specifying an absolute pictorial configuration of the digital image. The determination of the display parameter is based on the viewing direction of the user onto the absolutely pictorial configuration of the digital image, such that a relative, perspective-related configuration of the digital image is obtained so that the relative, perspective-related configuration corresponds to a target configuration of the digital image. The control unit generates the digital image as a
(Continued)

function of the determined display parameter and the digital image is then displayed on the display surface.

15 Claims, 7 Drawing Sheets

(51) Int. Cl.
  *G06F 3/01* (2006.01)
  *G06F 3/0487* (2013.01)
  *G02B 27/01* (2006.01)
  *G06K 9/00* (2006.01)
  *G06T 3/00* (2006.01)
(52) U.S. Cl.
  CPC .......... *G02B 27/0101* (2013.01); *G06F 3/011* (2013.01); *G06F 3/013* (2013.01); *G06F 3/0487* (2013.01); *G06K 9/00597* (2013.01); *G06K 9/00845* (2013.01); *G06T 3/0093* (2013.01); *B60K 2370/12* (2019.05); *B60K 2370/149* (2019.05); *B60K 2370/1529* (2019.05); *B60K 2370/177* (2019.05); *B60K 2370/334* (2019.05); *B60K 2370/736* (2019.05); *B60K 2370/739* (2019.05); *G02B 2027/011* (2013.01); *G02B 2027/013* (2013.01); *G02B 2027/014* (2013.01); *G02B 2027/0138* (2013.01); *G02B 2027/0187* (2013.01)
(58) Field of Classification Search
  CPC ........ B60K 2370/177; B60K 2370/334; B60K 2370/736; B60K 2370/739; G02B 27/01; G02B 27/0101; G02B 2027/011; G02B 2027/013; G02B 2027/0138; G02B 2027/014; G02B 2027/0187; G06F 3/011; G06F 3/013; G06F 3/0487; G06K 9/00597; G06K 9/00845; G06T 3/0093; G09G 3/2003

See application file for complete search history.

(56) References Cited

FOREIGN PATENT DOCUMENTS

| | | |
|---|---|---|
| DE | 10 2006 050 547 A1 | 4/2008 |
| DE | 10 2010 037 169 A1 | 5/2011 |
| DE | 102 57 484 B4 | 3/2012 |
| DE | 10 2012 201 805 A1 | 8/2013 |
| DE | 10 2013 000 366 A1 | 7/2014 |
| DE | 10 2013 212 667 A1 | 12/2014 |
| DE | 10 2013 215 370 A1 | 2/2015 |
| DE | 10 2014 207 398 A1 | 10/2015 |
| DE | 10 2016 212 687.3 | 7/2016 |
| DE | 10 2016 200 031 A1 | 12/2016 |
| WO | 2007/000178 A1 | 1/2007 |
| WO | 2016/098102 A1 | 6/2016 |
| WO | PCT/EP2017/066910 | 7/2017 |

OTHER PUBLICATIONS

Haeuslschmid at al.: "A Design Space to Support the Development of Windshield Applications for the Car", Human Factors in Computing Systems, ACM, May 7, 2016, pp. 5076-5091.
International Search Report dated Oct. 18, 2017 from International Patent Application No. PCT/EP2017/066910, 10 pages.

* cited by examiner

METHOD FOR OPERATING A DISPLAY DEVICE OF A MOTOR VEHICLE

CROSS REFERENCE TO RELATED APPLICATIONS

This application is a U.S. national stage of International Application No. PCT/EP2017/066910, filed on Jul. 6, 2017. The International Application claims the priority benefit of German Application No. 10 2016 212 687.3 filed on Jul. 12, 2016. Both the International Application and the German Application are incorporated by reference herein in their entirety.

BACKGROUND

Described herein is a method for operating a display device of a motor vehicle, wherein the display device is designed to output a digital image on a display surface of the motor vehicle. A display device is in this case an apparatus or an apparatus component that is configured to display image content. The display device may output a digital image on a display surface of the motor vehicle, that is to say on that surface on which the digital image appears to a user. It is possible to use augmented reality by way of the method described herein.

For a user of a motor vehicle, there are computer programs that use augmented reality and, to execute these programs, the user puts on data glasses. Such programs are intended to be used, for example, in what are called driverless motor vehicles, that is to say in motor vehicles that drive autonomously. To this end, there may be provision for the data glasses to capture a viewing direction of the user and to enable exact positioning of a virtual image on a defined display region, that is to say on a defined subregion of the display field of the display device. The display device is in this case configured as a spectacle lens of the data glasses. A camera image of a real depiction may thus be overlaid with an augmented reality, for example.

Such data glasses are positioned directly in front of the eyes of the user, as a result of which the user, even when moving his head, always looks at the display surface in a front-on view, and a digital image to be displayed is perceived in undistorted form. In the case of using computers with a screen instead of data glasses, the screen is turned such that the viewer faces the screen front-on.

If neither data glasses nor a computer are used, in the case for example of using a head-up display with a windshield, the problem arises that the driver or the occupants use a relatively large display surface that is further away from them under some circumstances.

Above all, if the user wishes for example to use a side window pane of a driverless vehicle as display surface, a text displayed by way of augmented reality may be strongly distorted and difficult to read under some circumstances, as the user looks obliquely through the window pane in some circumstances as he is strapped in during the journey. Application programs ("apps") for augmented reality are able to be used in connection with a windshield or a side window pane, but the depiction of the augmented reality is often perceived in distorted form. For a depiction without distortion, a computer screen has to be fastened for example to the windshield or held in front of it in order to use this application program.

The problem arising from the related art is illustrated in FIGS. 1a and 1b. FIGS. 1a and 1b each show a display surface 10 with a digital image 12 displayed thereon. In FIG. 1a, the situation is illustrated from the view of a user who is standing or sitting in front of the display surface 10 and is seeing the digital image 12 in undistorted form. FIG. 1b shows the situation in which the user is standing or sitting to the side of the display surface 10 and thus perceives not just the display surface 10 but also the digital image 12 in perspectively distorted form. The relative form, brought about by perspective, of the digital image 12 of FIG. 1b has the effect that the user perceives the digital image 12 as a tapering object that is arranged closer to a more remote edge of the display surface 10 than to an edge of the display surface 10 being faced. If the digital image 12 shows writing or a text, for example, this is not easily able to be read.

German Patent Application Publication DE 10 2013 215 370 A1 proposes incorporating information about a driving situation or driving intentions, for example of a vehicle in front, onto the windscreen using a head-up display. A similar method is proposed by German Patent Application Publication DE 10 2014 207 398 A1, in which a camera external to the motor vehicle records the surroundings. A corresponding device for a rear camera is described in German Patent Application Publication DE 199 11 648 A1.

German Patent Application Publication DE 10 2006 050 547 A1 proposes a variant in which a virtual image is projected onto a virtual image plane outside the motor vehicle.

The disadvantage furthermore exists, however, that large users perceive a depicted image in distorted form, for example. To this end, German Patent Application Publication DE 10 2012 201 805 A1 proposes, in the case of a stereoscopic display apparatus, to correct what is called crosstalk of interfering data in an item of image content. German Patent Application Publication DE 10 2013 212 667 A1 discloses a method in which preliminary distortion of an image for a first eye of the viewer takes place, as well as preliminary distortion of a second image for a second eye of the viewer. A three-dimensional image is generated therefrom.

The related art furthermore has the disadvantage, however, that the methods mentioned above are performed by the manufacturer and do not take into account individual requirements of a passenger. Augmented reality is therefore only able to be provided to a limited extent.

SUMMARY

One of the aspects underlying the disclosure is to improve augmented reality on a display device of a motor vehicle.

The method described herein is based on the concept of capturing a viewing direction of a user toward the display surface with the aid of a first sensor device of the motor vehicle. Depending on this captured viewing direction, the digital image is then formed and output on the display surface by the display device. As a result of this, augmented reality is able to be used in the motor vehicle and tailored to the individual requirements of the user. A text that is depicted may thus be depicted more legibly and in less distorted form, even if the user is looking at the display surface at a very narrow angle, for example. In the case of an oblique or perspective view of the display surface, such as for example in the case of looking through a pane of a side window in the motor vehicle, the display is thus depicted in undistorted form for the user and is thus readily legible. Movements of the viewer are thus able to be compensated dynamically and fatigue-free viewing of the content is able to be ensured. Better visibility of the digital image also arises as a result of this.

The method described herein for operating a display device of a motor vehicle, wherein the display device is configured to output a digital image on a display surface of the motor vehicle, first of all includes the operation of capturing a viewing direction of the user toward the display surface using a first sensor device, wherein the user is situated in an inner space of the motor vehicle. A sensor device is in this case an apparatus or an apparatus component that is configured to sense for example physical parameters, and may include for example one or more cameras or viewing direction sensors in the inner space of the motor vehicle.

By way of a control device of the motor vehicle, that is to say by way of an apparatus or an apparatus component or software that is configured to process data and produce control signals and is configured for example as a microprocessor or microcontroller or may include a microprocessor or microcontroller, depending on the captured viewing direction, a display parameter of the digital image is defined that specifies an absolute visual form of the digital image. A display parameter is in this case a parameter that influences the visual form of the digital image, that is to say for example specifies a shape and/or a color and/or a perspective distortion. The absolute visual form of the digital image is in this case that form that the image actually has, that is to say for example an actual shape or position on the display surface.

The display parameter in this case takes into account the fact that a relative form, brought about by perspective, of the digital image results from the viewing direction of the user toward the absolute visual form of the digital image. In other words, the display parameter takes into account a distortion of the image perceived by the user due to the individual viewing angle, that is to say a relative position of the user with respect to the digital image. The relative form, brought about by perspective, of the digital image is thus that form of the digital image as the user perceives it from his perspective. The relative form, brought about by perspective, of the digital image thus corresponds to an intended form of the digital image, that is to say to a form that is intended to be perceived by the user.

In the case of an oblique or perspective view of the display surface, the display is thus depicted in undistorted form for the user and a text that is displayed is readily legible. Movements of the viewer are able to be compensated dynamically and fatigue-free viewing of the content is able to be ensured. Likewise, digital images or image elements that are intended to adopt a particular position on the display surface in relation to an object perceived through a window of the motor vehicle may be depicted such that the user is able to perceive them in the correct position independently of his size or body movements or seating position.

In an embodiment of the method described herein, for this purpose, a display device configured as a transparent screen is provided in the motor vehicle, wherein the screen has self-illuminating pixels and the display device includes the display surface. In other words, a window pane of the motor vehicle may be configured as a screen that differs from a projection surface of a head-up display to the extent that it is self-illuminating, that is to say produces and outputs the digital image itself and does not serve as a projection surface for a projector. The digital image is thereby advantageously visible directly on the window pane and there is no need for any extra apparatus, such as for example a head-up display or a mobile terminal. Installation space is therefore also saved. Application programs for augmented reality may advantageously be used in the motor vehicle with such a display device without having to apply a separate computer screen to the window pane or having to put on data glasses.

According to another embodiment of the method described herein, in which the display surface may be configured to be transparent, a second sensor device of the motor vehicle captures the surroundings of the motor vehicle. To this end, cameras may be arranged on or at an outer side of the motor vehicle roof, for example. On the basis of the captured viewing direction, a determination of the surroundings of the motor vehicle visible to the user through the display surface is able to be determined by the control device. In other words, the control device then determines which region of the surroundings of the motor vehicle is able to be seen accurately by the user. There is then determination of a real object in the surroundings visible to the user, for example of another motor vehicle or of a ship or of a tree, and a contour and/or a color of the real object is determined on the basis of sensor data of the second sensor device. Depending on the determined contour and/or the color of the real object, the display parameter that describes a contour of the digital image corresponding to the contour of the real object and/or a color of the digital image different from the color of the real object as absolute visual form of the digital image is adjusted. In other words, for example, the digital image may adopt the contour of the real object or a color that differs from the actual color of the real object. If for example two real objects are thus superimposed in the visible surroundings, one of them or both of them may for example be highlighted by the shape-adjusted and/or color-adjusted form of the digital image, and both objects are able to be better distinguished from one another. The digital image in this embodiment may be indicated as a marker symbol and its shape adjustment and/or color adjustment ensures better visibility.

As an alternative or in addition, there may be provision for the second sensor device to capture the surroundings of the motor vehicle and for the control device, on the basis of the captured viewing direction, to determine the surroundings of the motor vehicle visible to the user through the display surface and the real object in the surroundings visible to the user. Depending on a connecting line between an eye point of the user and the real object lying through the transparent display surface, the control device may determine a point of intersection of the connecting line and the transparent display surface and adjust the display parameter such that it describes the determined point of intersection as the position of the digital image on the display surface in order to mark the real object, visible to the user, on the display surface. In other words, the digital image is positioned on the display surface such that it is in a predetermined relationship with the visible real object from the view of the user. As a result, it is possible to take into account head movements, changes in position or various body sizes of different users, by dynamically changing the position of the digital image on the display surface.

In one development, an interest profile of the user is provided, a priority of the determined real object is determined on the basis of the interest profile, and the digital image is produced if the determined priority has a predetermined value. All visible, real objects are therefore not marked indiscriminately, but rather only those in which the user has an individual interest. In one development thereof, a context of a behavior of the user may be determined by a) determining an item of content of websites visited by the user using a browser device, and/or by b) determining an item of content of speech of the user in the inner space using a speech recording and speech recognition device of the control device; and/or c) determining an item of content of a digital survey; and/or d) determining a geographical location, for example using a GPS signal of a portable navigation apparatus, that the user has visited with or without the motor vehicle. By way of example, it may also be determined from the context which businesses, restaurants, bars, museums, concerts, and/or which nature sites or countryside the user has visited, and/or for example music that the user has listened to. The interest profile is established on the basis of the determined context. As a result of this, there is intellectual recognition of the interests of the user by the control device. The need for the user having to program the control device according to his interests is dispensed with.

According to another embodiment of the method described herein, determination of a perspective from which the user sees the digital image may be determined, for example on the basis of the sensor data of the first sensor device. The determination of the display parameter takes into account the determined perspective and thus describes a perspective removal of distortion from the digital image, such that the digital image is able to be viewed from an intended perspective, even though the user is looking at the display surface at a very acute angle, for example. In the case of an oblique or perspective view of the display surface, the display is nevertheless able to be depicted in undistorted form for the user, and an exemplary text is thus readily legible. Movements of the viewer are able to be compensated dynamically and fatigue-free viewing of the content is able to be ensured.

In one development, a curvature of the display surface may be captured, for example by reading out digitally stored manufacturer data with regard to a curvature of a window pane, and the display parameter may be determined on the basis of the captured curvature. As a result of this, a perspective error that may arise as a result of a design-based configuration of a window pane is able to be compensated.

The abovementioned features are likewise achieved by a control device that may have a microprocessor or microcontroller, wherein the microprocessor or the microcontroller is designed to perform the method operations, relevant to a control device, of the embodiments of the method described herein. The abovementioned advantages result.

The abovementioned features are likewise achieved by a motor vehicle that has the control device described herein, a display device and a display surface. The abovementioned advantages also result here. In one development, the motor vehicle may have a display device that includes the display surface and is configured as a transparent screen with self-illuminating pixels, for example wherein the display device may be configured as a window of the motor vehicle and/or as a dual view screen. The abovementioned advantages result. In the case of a transparent dual view screen, in the case of use by a plurality of users, it is advantageously the case that each user only sees those markers that are intended for him.

The method, control device, and motor vehicle, are explained again in more detail by example embodiments with reference to the drawings. The exemplary embodiments explained below are examples. In the exemplary embodiments, the described components of the embodiments however each constitute individual features that should be considered independently of one another and that each also develop the disclosure independently of one another and therefore should also be considered individually or in a combination other than the ones shown. Furthermore, the described embodiments may also be supplemented by one or more of the previously described features.

BRIEF DESCRIPTION OF THE DRAWINGS

These and other aspects and advantages will become more apparent and more readily appreciated from the following description of the example embodiments, taken in conjunction with the accompanying drawings, of which.

DETAILED DESCRIPTION

Figure 1A:
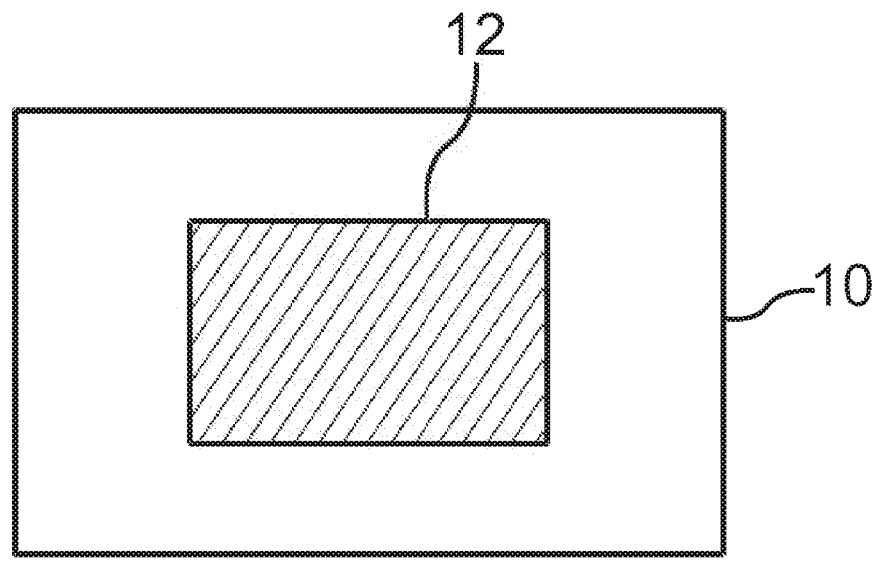
FIG. 1a and FIG. 1b are respective schematic sketches of a front-on view and a perspective view of a display surface according to the related art.
Figure 1B:
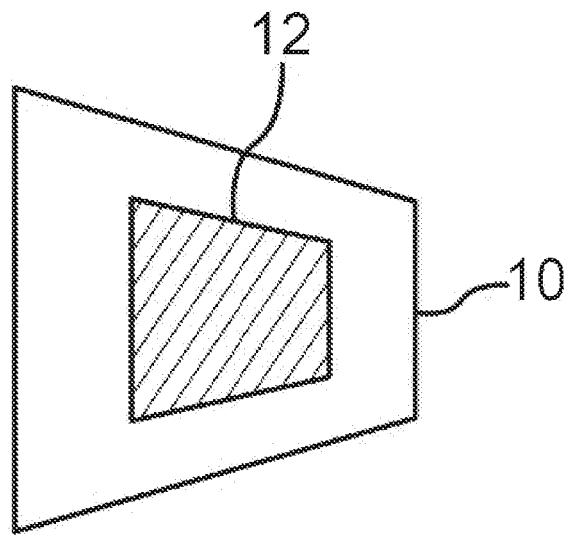

Reference will now be made in detail to examples which are illustrated in the accompanying drawings, wherein like reference numerals refer to like elements throughout.

Figure 2A:
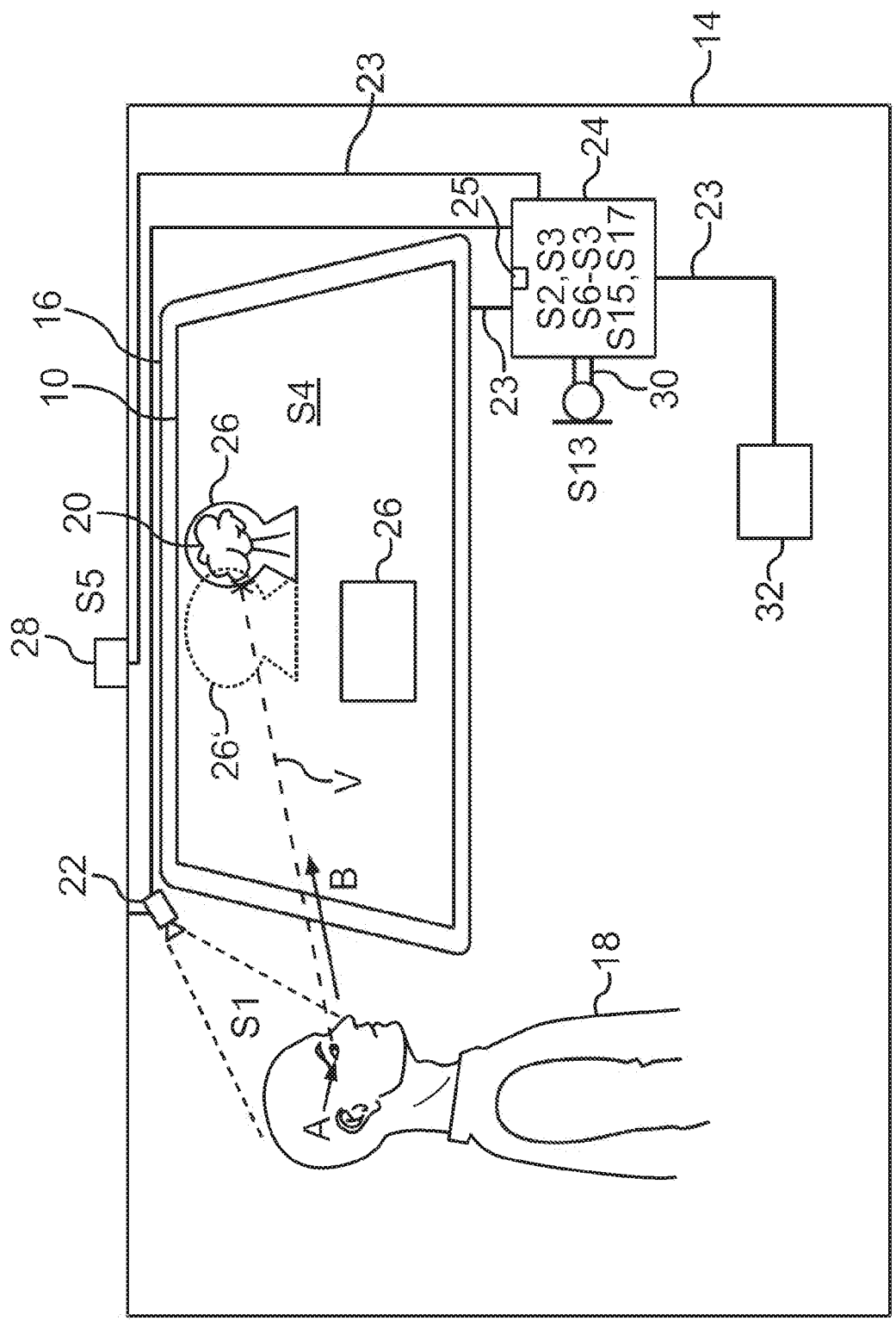
FIG. 2a is a schematic sketch of an embodiment of the method described herein.

FIG. 2a in this case schematically illustrates the principle of the method described herein with reference to an exemplary embodiment. To this end, FIG. 2a shows a motor vehicle 14, for example a motor car, such as for example a passenger vehicle or a driverless passenger vehicle. A display device 16 is arranged in the motor car, which display device may be configured for example as a screen, for example as a transparent screen. The exemplary transparent screen may be configured for example as a transparent OLED ("TOLED"), that is to say as what is called a "transparent organic light emitting device screen". The individual light-emitting elements may in this case also be considered to be pixels of the exemplary screen. These are not visible in an inactive state. The desired screen becomes visible only upon activation. Techniques for manufacturing such a transparent screen are known to a person skilled in the art from the related art. The exemplary display device described herein may be installed in a motor vehicle 14, however, by customizing and using the screen as a side window or windshield, for example.

If the method described herein is applied to a plurality of users 18 (only one user 18 is shown in FIG. 2a), what is called a dual view screen may advantageously be used. Corresponding electronics for manufacturing navigation systems are also known to a person skilled in the art here from the related art. As an alternative, the menus and markers may be customized for example by a shape and/or a color, such that a plurality of occupants are able to see which displays or digital images are for them.

Due to the transparency of the exemplary display surface 10 of the example of FIG. 2a, the user 18 may for example see a real object 20 that is situated in surroundings outside the motor vehicle, for example another car, a tree or a boat.

The motor vehicle 14 has a first sensor device 22, for example a camera or a stereo image camera, which may be able to be arranged in an inner space of the motor vehicle on a motor vehicle roof. The first sensor device 22 may be connected to a control device 24 of the motor vehicle 14, for example by way of a wired or wireless data communication connection 23, for example a data bus of the motor vehicle 14 or a WLAN connection. The display device 16 is in this case likewise connected to the control device 24 using a data communication connection 23. The control device 24 may be configured for example as a separate control apparatus having a microprocessor 25 or microchip. As an alternative, the control device 24 may be configured for example as a control chip of the display device 16 and be installed in a switch panel of the motor vehicle 14, for example. A digital image 26 may be seen on the display surface 10. In the example of FIG. 2a, the digital image 26 is configured as a border of the real object 20, for example.

In the exemplary embodiment illustrated in FIG. 2a, the exemplary motor vehicle 14 may have another sensor device 28 that is able to capture surroundings outside the motor vehicle 14 (S5). This sensor device 28 may be arranged on an outer side of a motor vehicle roof, for example.

The motor vehicle 14 may furthermore optionally have a speech recording and speech recognition device 30, which may be configured for example as a directional microphone of the control device 24 or as a component separate from the control device 24. This is designed to perform speech recording and thus to record speech of a plurality of occupants or an audio signal of a radio, for example. Furthermore, the speech recording and speech recognition device is designed to analyze the recorded audio signal and to recognize spoken speech. For this purpose, known algorithms by way of which an intonation of the speech is also able to be determined, for example, are known to a person skilled in the art from the related art. A priority of something about which the user 18 is speaking is then able to be determined on the basis of the intonation.

The control device 24 may optionally be connected to a browser device 32, for example a control chip of an onboard computer, which may be designed to provide an Internet connection and may have for example software for using the Internet.

According to the method described herein, the sensor device 22 captures a viewing direction B (illustrated as an arrow in FIG. 2a) of the user 18 (method operation S1). In the example of FIG. 2a, the user 18 may for example be sitting at a side wall of the motor vehicle 14 and thus be looking through the window pane, that is to say at the display surface 10, at a very narrow angle. The example of FIG. 2a in this case shows an exemplary embodiment in which the user 18 sees a real object 20 in the surroundings of the motor vehicle 14 directly or indirectly from the angle of the eye. The control device 24 may then determine these visible surroundings (S6).

In one variant, the user 18 may however also be looking at a rectangular text field or a field in which a film is being shown as a digital image 26 that is displayed in the front-on view in the example of FIG. 2a. Due to his viewing direction B and the acute viewing angle, this exemplary text field may however not appear to the user 18 as a rectangle in the front-on view as shown in FIG. 2a, but rather perspectively distorted; in other words, the digital image 26 has a relative form, brought about by perspective, for the user 18. This variant of the method described herein is explained in more detail further below in FIGS. 5a, 5b and 5c.

The control device 24 may then recognize the camera image transmitted by the second sensor device 28 as a normal image analysis method, for example use shape recognition to recognize individual real objects 20 that the user 18 is seeing (S6). The control device 24 may likewise determine a contour and/or a color of the real object 20 (S7).

In the example of FIG. 2a, the control device defines a display parameter of the digital image 26 depending on the captured viewing direction B (S2). This display parameter determines for example a shape and/or a color and/or a relative position of the digital image on the display surface 10. This may be performed for example using image processing software that may be present in the control device 24. By way of example, the display parameter may specify a shape that is a border of the real object 20.

The example of FIG. 2a in this case shows an intended form of the digital image 26, that is to say that form in which the user 18 is intended to perceive the digital image 26 in spite of his lateral position and his acute viewing angle toward the display surface 10. In this case, it appears to the user 18 that the digital image 26 borders the real object 20. The actual form, that is to say the absolute visual form of the digital image 26, may however, seen from a front-on perspective, be configured like the digital image 26', shown in dashed lines, which may appear to a viewer with a front-on perspective, that is to say in a front-on view, to be shifted for example to the left from the real object 20. The shifting of the position results from the definition of the display parameter (S2), in which the captured viewing direction B and/or a relative position of the user 18 with respect to the display surface 10 is factored in. This then results, for the user 18, in other words, from the absolute visual form of the digital image 26, that is to say in this example as a result of an apparently shifted position, and his perspective from his viewing direction B, in the intended form of the digital image 26 in which the digital image 26 apparently borders the real object 20. The real image 26 is in this case produced by the control device 24 (S3) and output by the display device 16 (S4).

In addition or as an alternative, the display parameter may define a color in which the digital image 26 may be output. Such a color selection may be preset for example by a trader of the motor vehicle 14. The exemplary image recognition software may for example determine that the real object 20, the exemplary tree, actually appears in green and/or for example may stand in a green background. In this case, the display parameter may for example define that the digital image 26, the exemplary marker symbol, may appear in black. If the user 18 sees for example a winter landscape full of snow through the display surface 10, then a black coloring of the digital image may be advantageous. The contrast between the real image and the surroundings is thereby increased.

If the user 18 moves, for example, then the exemplary position of the digital image 26 is dynamically adjusted (S8), such that the digital image 26 is able to "shift" in terms of its absolute form over the display surface 10 while the user 18 is moving, for example. From the view of the user 18, however, the digital image 26 always remains in its relative position with respect to the real object 20.

In the case of such a dynamic adjustment (S8), the control device 24 may determine a point of intersection S between a connecting line V and the real object 20 depending on the connecting line V (depicted in dashed form in FIG. 2a) between an eye point A of the user 18 and the real object 20 (S9). The display parameter then describes the determined point of intersection S as the position on the display surface in order to mark the real object 20.

Figure 2B:
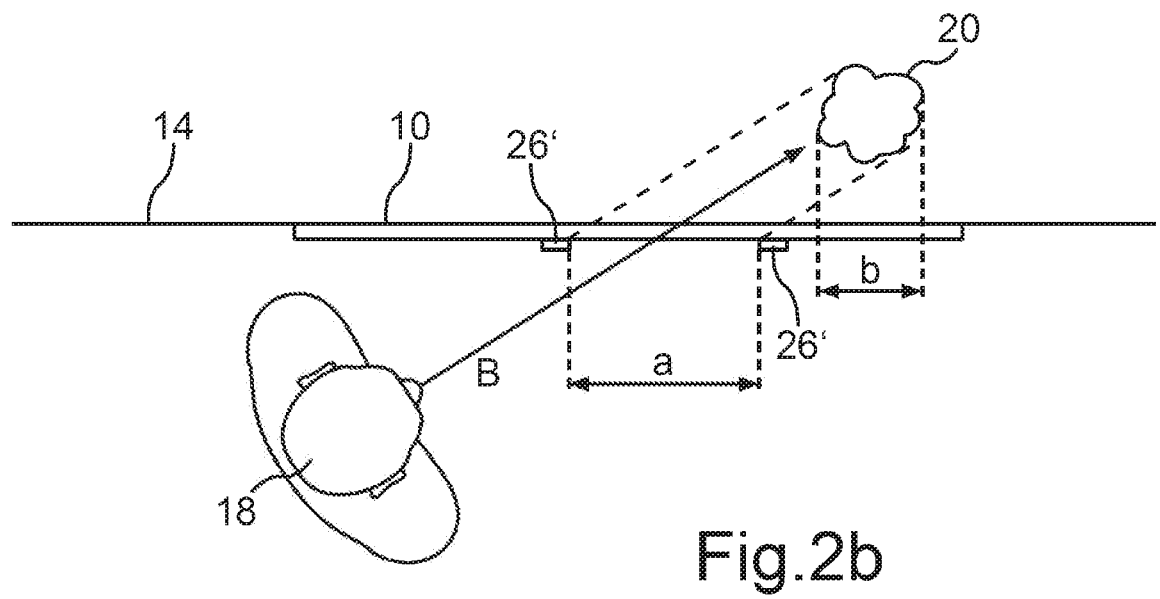
FIG. 2b is a schematic sketch of the embodiment of FIG. 2a in a top view.

FIG. 2b shows a sectional view of the user 18 and the display surface 10 from above. FIG. 2b in this case shows the shape of the digital image 26', which is much larger than perceived by the user 18, the reference signs 26' being directed to the outer edges of the digital image 26' in FIG.

2*b*. The dashed line in this case marks the surroundings bordered from the perspective of the user. A width a of the digital image 26' may in this case be wider than a width b that the real object 20 would have from the view of the user in a front-on view, so as to enable the intended perspective.

Figure 3A:
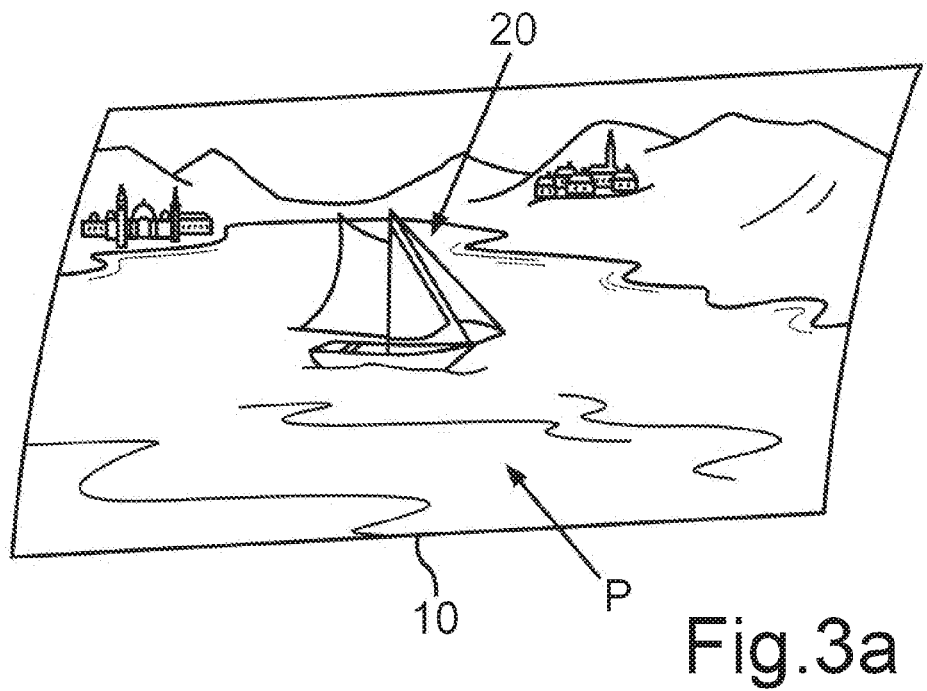
FIG. 3a is a schematic sketch of exemplary surroundings as may be seen by an occupant of a motor vehicle.
Figure 3B:
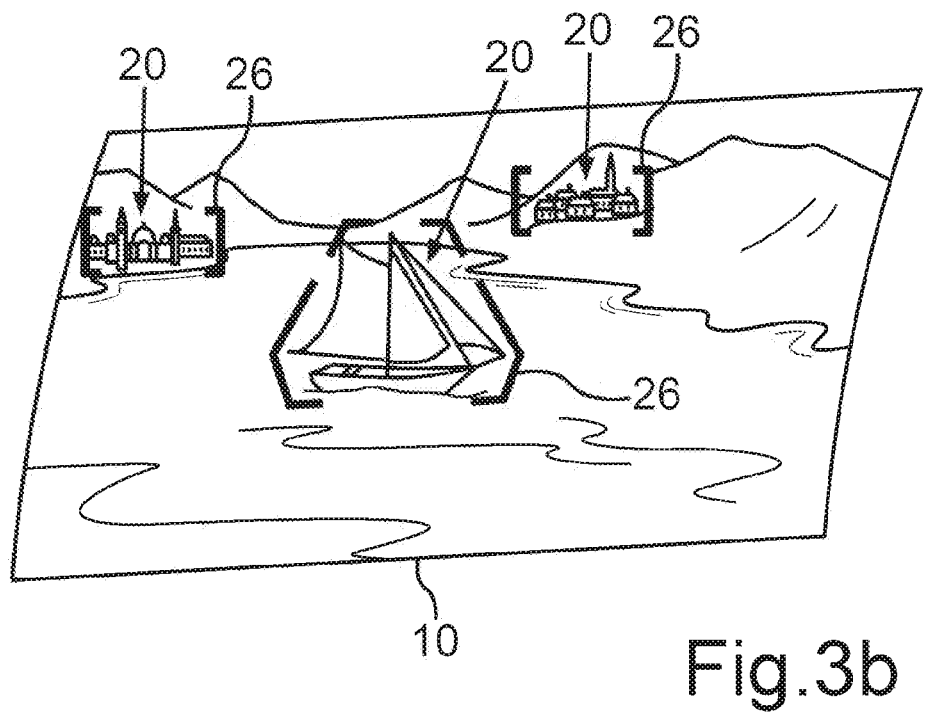
FIG. 3b is a schematic sketch of another embodiment of the method described herein.
Figure 4A:
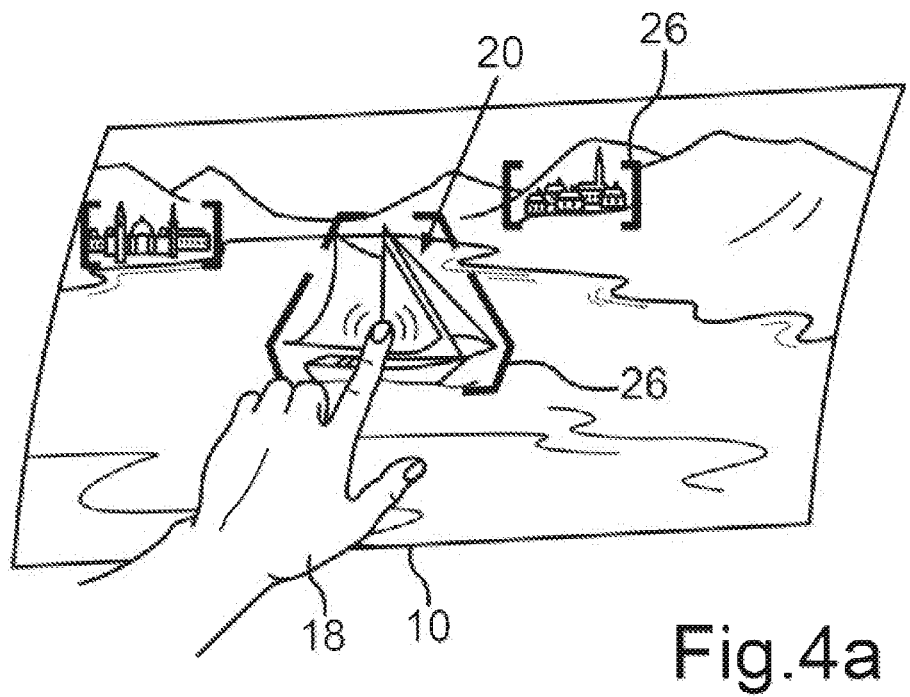
FIG. 4a and FIG. 4b are respective schematic sketches of another embodiment of the method described herein.
Figure 4B:
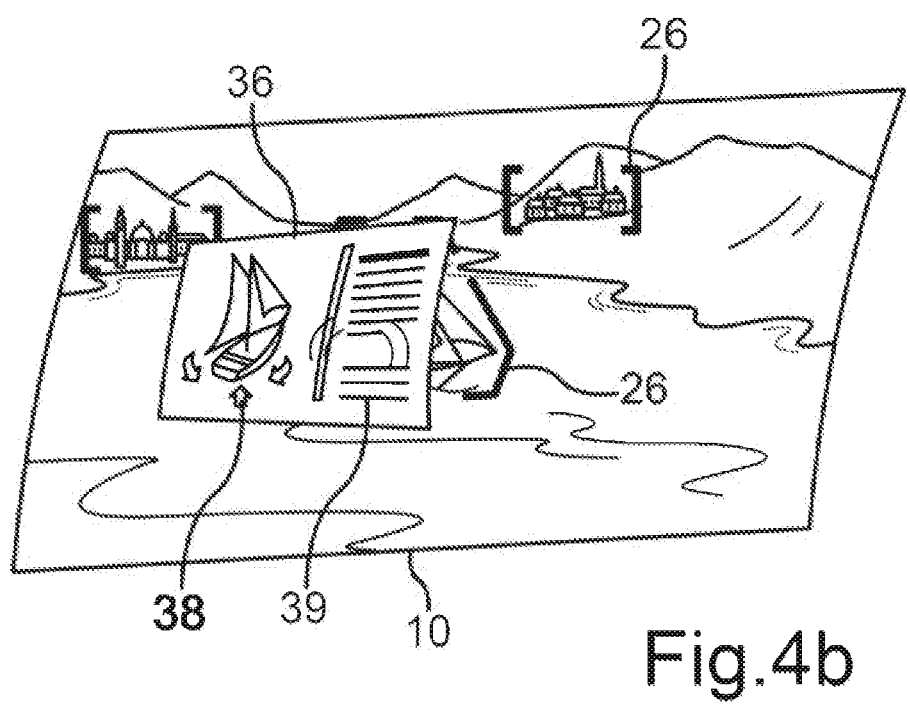

FIGS. 3*a* and 4*b* again illustrate another exemplary embodiment of the method described herein in the variant described with respect to FIG. 2*a*. FIG. 3*a* in this case shows the display surface 10 and the surroundings of the motor vehicle 14, wherein the surroundings may be seen as a panoramic P. The user 18 may see a boat, a mountain and a house as real object 20, for example. FIG. 3*b* shows the relative forms, brought about by perspective, of the digital images 26 that the user 18 is able to see as a frame with an adjusted shape and/or color.

In addition, there may for example be provision for the display device 16 for example to be able to display an information field 36 containing information regarding the real object 20, for example. This may be performed for example by touching a region of the display surface 10 using a finger of the user 18 (FIG. 4*a*). To this end, the display surface 10 may be coated for example with a touch-sensitive film known from the related art, which may be designed as an operating device. As an operating device, it is able to capture the operating action of the user 18, that is to say the touch, and convert it into a digital signal. FIG. 4*b* in this case shows information 36 that is then produced by the display device 16 and is able to be displayed on the display surface 10. In the example of FIG. 4*b*, this may be for example an interactive three-dimensional model 38 with virtual rotation. A text description 39 may furthermore be output, for example. FIGS. 4*b* and 4*a* in this case show, by way of example, how the real object 20 may frame the shape-adjusted and/or color-adjusted digital image 26.

FIG. 2*a* shows an optional speech recording and speech recognition device 30, which may be integrated for example into the control device 24 or into a steering wheel of the motor vehicle 14, for example. There may optionally be provision, according to the method described herein, for this speech recording and speech recognition device 30 for example to be able to record speech of other users 18 and to use an algorithm known from the related art for example to perform speech recognition. The speech recognition may be used for example to determine the topic about which the user 18 is talking (S13). It is thereby possible for example to filter out keywords, such that an area of interest of the user 18 is able to be determined using the speech recognition. A context of the speech determined using the speech recognition may then be used to provide (S10) or to establish (S14) an interest profile of the user 18 (or of a plurality of users 18), which interest profile may be stored in the control device 24 as a digital file, for example. If a plurality of users 18 are interested in nature, for example, then the interest profile may for example store terms such as "tree", "flowers" or "mountain". As an alternative or in addition, there may also be provision for the sensor device 22 to be designed to capture a facial expression of the user 18, and the control device 24 is able to use corresponding software to recognize whether something about which the user 18 is currently speaking is of interest or is connected with pleasure. The interest profile may also be established for example on the basis of destinations or points of interest on a current route stored in a navigation system (not shown in FIG. 2*a*).

If the control device 24 recognizes for example a tree as a real object 20 using the image analysis, the control device 24 may compare the result of the pattern recognition with the stored terms in the interest profile. In the cited example, the comparison may then reveal that the key term "tree" or "nature" is also stored in the digital interest profile. On the basis of this result of the comparison, the control device 24 may then select the tree as a real object 20 to be marked. Another object recognized using the image analysis, for example a factory, may then not be marked because the term is not stored in the interest profile. However, the occupant may for example have the opportunity at any time to touch an object 20 on the exemplary window pane, even if a real object 20 is not marked. This object 20 may then be marked and information about it may be retrieved.

As an alternative or in addition, the interest profile may also be established by the optional browser device 32 on the basis of an item of content from websites that have been visited by the user 18 (S14). To this end, the result of the image analysis may be compared with an item of content from websites stored in a memory of the browser device 32.

As another exemplary embodiment, it is conceivable for the user 18, for example when buying the motor vehicle 14, to have filled out a digital survey in which he specifies his interests. This digital information may then be stored in the control device 24, for example.

In the example with the tree as real object 20, which may likewise be stored in the interest profile as a term, it has been shown that the control device 24 is able to determine a priority of the determined real object 20 on the basis of the interest profile (S11). There may be provision in this case, in the case of a positive comparison of the result of the image analysis and of the result of the interest profile, for a priority to be assigned in the form of a value, wherein the digital image 26 may then be produced when the determined priority has a predetermined value (S12).

Figure 5A:
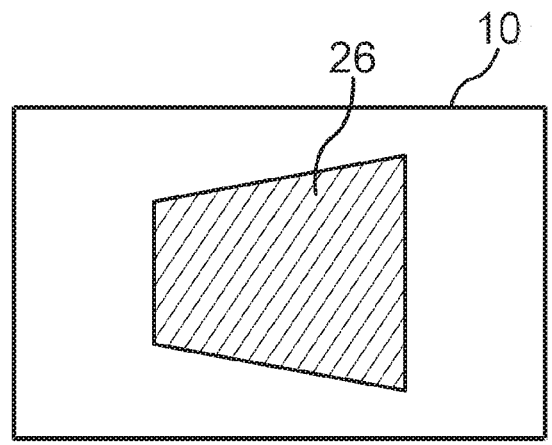
FIGS. 5a, 5b, and 5c are respective schematic sketches of another embodiment of the method described herein.
Figure 5B:
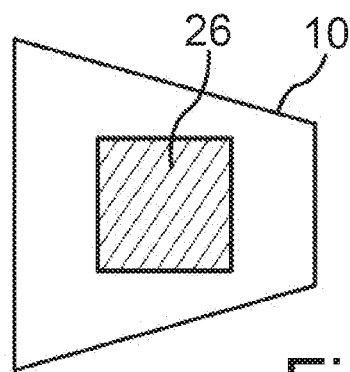
Figure 5C:
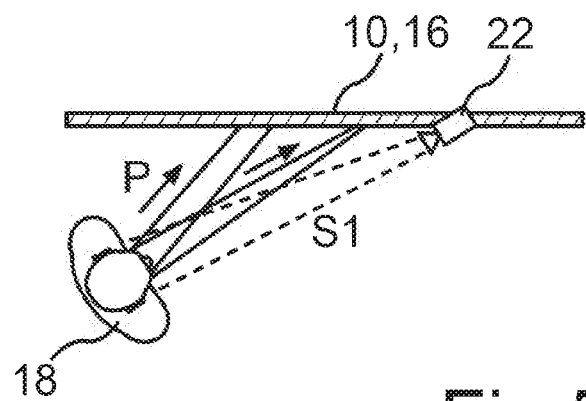

FIGS. 5*a*, 5*b*, and 5*c* show another exemplary embodiment of the method described herein, in which the control device 24 (not shown in FIGS. 5*a* to 5*c*) is able to determine a perspective from which the user 18 is seeing the digital image 26 on the basis of the viewing direction P of the user 18 (S15). FIGS. 5*a*, 5*b*, and 5*c* in this case show the user 18 and the angle at which the user 18 is looking at the display surface 10. In the case of a head movement, the viewing direction P changes to the viewing direction P'.

When the display parameter is defined (S2), the determined perspective is then taken into account and the display parameter describes a perspective distortion of the digital image 26, such that the digital image 26, as shown in FIG. 5*b*, is able to be viewed from the intended perspective. FIG. 5*b* shows that the digital image 26 appears by way of example as a square or rectangle from the intended perspective. If the digital image 26 is a text field, for example, then a text displayed thereon is able to be read very well as all of the letters appear the same size.

FIG. 5*a* shows the corresponding absolute visual form of the digital image 26, wherein the rectangular text field has been distorted into an open trapezoid, for example, such that it appears in undistorted form from the viewing perspective, that is to say from the intended perspective (FIG. 5*b*). In other words, FIG. 5*a* shows the preliminarily distorted digital image 26 in a front-on view, that is to say in its absolute visual form.

When determining the display parameter, a curvature of the display surface 10, for example a curvature of a side window pane, may also be taken into account, for example. To this end, a curvature factor stored by the manufacturer may also be stored in the control device 24, for example.

Figure 6A:
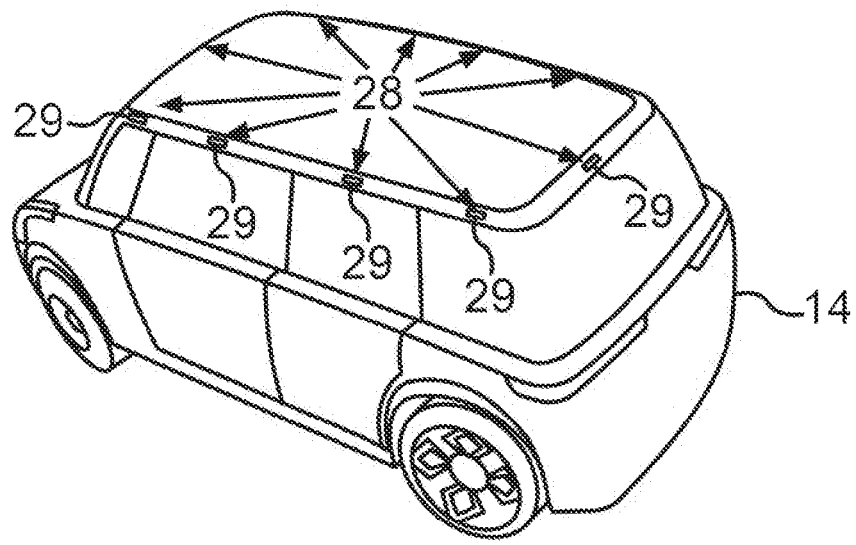
FIG. 6a and FIG. 6b are respective schematic sketches of an embodiment of a motor vehicle described herein.

FIG. 6*a* shows an exemplary embodiment of a motor vehicle 14 described herein, by way of example. In this case, this may be for example a passenger vehicle, for example a driverless passenger vehicle. FIG. 6a in this case shows the motor vehicle 14 with a second sensor device 28, wherein the second sensor device 28 may have a plurality of individual cameras 29, for example. The exemplary individual cameras 29 may be mounted or fastened on the vehicle 14 using known methods, for example by integrating or inserting the individual cameras 29 into a roof membrane or into a recess in the fender. There may be provision for the individual cameras 29 to be able to be embedded into a strip, for example, wherein the strip may border the motor vehicle roof. The arrows on the roof of the motor vehicle 14 in this case point to advantageous positions of the individual cameras 29. The surroundings of the motor vehicle 14 and around the motor vehicle 14 are thus able to be recorded.

Figure 6B:
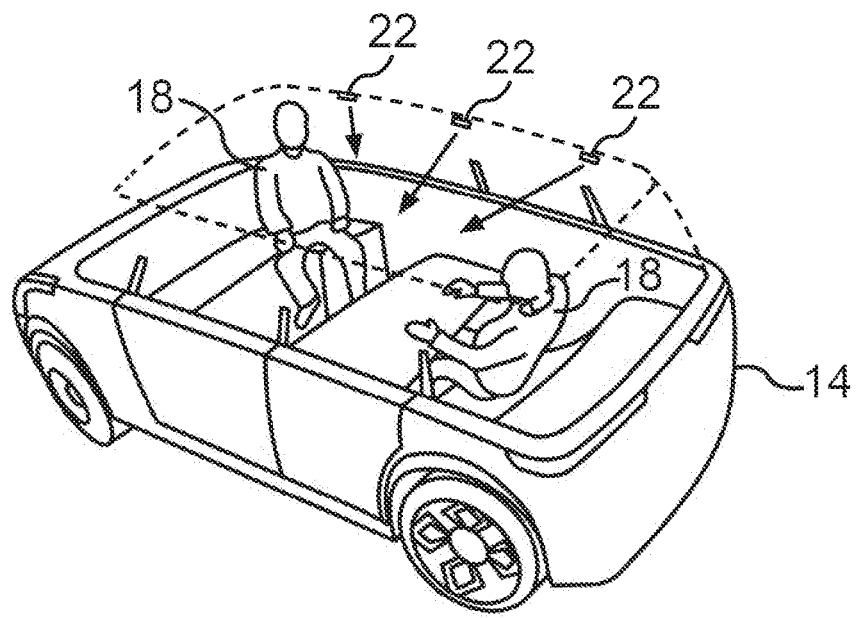

FIG. 6b shows another exemplary embodiment of the motor vehicle 14, wherein the inner space of the motor vehicle 14 is illustrated with two users 18. An inner space of the motor vehicle 14, which inner space may be used for example to install the sensor device 22, is illustrated as a dotted line. The exemplary cameras of the first sensor device 22 may be arranged for example on a reading light or on an inner side on the strip bordering the motor vehicle roof. The first sensor device 22 may in this case likewise have a plurality of individual cameras. The arrows in this case show the orientation of the individual cameras by way of example.

The exemplary embodiments outlined above illustrate the principle of the disclosure of adjusting a digital image 26, that is to say a display element, a display surface 10, for example a vehicle window pane, by way of view recognition and/or view direction recognition, perspectively inclined with respect to the viewer and dynamically.

According to another exemplary embodiment, the capturing of the viewing direction P (S1) may be used to determine not only a position of the digital image 26 but also a viewing angle with respect to the display surface 10, that is to say with respect to the display for example. This oblique/perspective view may be compensated digitally and, in doing so, curved display surfaces 10 (such as for example a side window pane in the motor vehicle 14) may also be factored in, for example.

In the case of an oblique/perspective view of the display surface 10, that is to say for example of a display (such as for example in the case of a side window pane in the motor vehicle 14), the display is depicted in undistorted form for the viewer and is thus readily legible. Movements of the user 18 are compensated dynamically and fatigue-free viewing of the content is made possible.

The digital image 26 or digital images 26 are able to be depicted at the correct position on the display surface 10 or a plurality of display surfaces 10, that is to say for example on screens, by way of augmented reality (AR). The first sensor device 22, which may include for example a plurality of cameras, may in this case capture the viewing direction P of the user 18, that is to say of the viewer, and enable exact positioning on a defined display region. A control device 24, for example a computer, may calculate an adjustment factor, that is to say the display parameter that is able to be calculated in "real time" with respect to an inclined digital image 26, for example, from the angle from the user 18 to the exemplary screen. An exemplary rectangular digital image 26 may be distorted for example into an open trapezoid, such that it appears in undistorted form from the perspective of the viewer (FIG. 5a, FIG. 5b, FIG. 5c).

According to another exemplary embodiment, a shape-adjusted and/or color-adjusted digital image 26 may be displayed as marker around a real object 20 of the display surface 10, for example on a transparent window display.

To this end, on the display surface 10, for example on a transparent side window pane of the vehicle 14, with a transparent display, the real object 20 that the user 18 sees outside the motor vehicle 14 may frame a shape-adjusted and/or color-adjusted digital image 26, that is to say a shape-adjusted and color-adjusted "marker". In the event of a relative movement between the user 18 and the object 20, the digital image 26 may be positioned on the display surface 10 such that it is always able to precisely frame the real object 20.

This application is conceived in particular for users 18 of a driverless motor vehicle 14 (or for example the passengers in a motor vehicle 14 being controlled by a person). The display surface 10 or a plurality of display surfaces 10, that is to say the exemplary window panes, may be provided so as to have a transparent display over their whole area.

The real object 20 that the user 18 sees outside the motor vehicle 14, or the real objects 20 that a plurality of users 18 see outside the motor vehicle 14, may be framed with shape-adjusted and/or color-adjusted "markers". In the event of a relative movement between the user 18 and the real object 20 outside, these markers may be positioned on the exemplary display such that they always precisely frame the real object 20.

The real objects 20 or the real object 20 may be selected on the basis of an interest profile of the user 18. This profile may be established for example on the basis of an Internet behavior, speech in the motor vehicle 14 and/or through surveys. Such preliminary filtering makes it possible for not too many objects to be marked in some situations.

FIG. 3a in this case shows for example an image of a sea panoramic P, as is able to be seen by a user 18 in the motor vehicle 17. FIG. 3b shows for example that the objects 20 of interest for a plurality of users 18 may be framed in a shape-adjusted and/or color-adjusted manner.

The exemplary shape of the marker may follow a contour of the real object 20. The color may be selected such that it provides good contrast with respect to a background. The exemplary ship may for example be framed in green and the buildings in the forest may be framed in blue.

FIG. 6a shows another exemplary embodiment of a motor vehicle 14 that may have cameras 29 outside the car, which cameras are able to capture or register the surroundings (S5).

FIG. 6b shows another exemplary embodiment of a motor vehicle 14, having exemplary cameras in the inner space that capture or register the user 18 and for example his eye movements (S1). It may thus be calculated for example which user 18 is seeing what outside the motor vehicle 14.

The digital image 26, that is to say the exemplary marker, compensates the relative movement between a user 18 and the real object 20.

There may furthermore be provision to show markers for a plurality of users 18 on an exemplary display. The markers may be adjusted in terms of color and/or shape. For example, a transparent dual view display as display device 16 may reduce the number of exemplary markers that are visible to a user 18, such that a person does not see the markers that are not intended for him.

FIGS. 4a and 4b show another exemplary embodiment according to which, in the event of a "touch" as operating action within an exemplary marker, a menu containing information may open.

The advantages arise here that the exemplary markers are only shown when an object is of interest to the user 18. The exemplary markers are shape-adjusted and/or color-adjusted for better visibility. If for example two objects overlap, they are able to be better distinguished by the shape-adjusted and/or color-adjusted form and thus better kept apart from one another. The exemplary markers may be visible directly on the exemplary window pane and not on an extra apparatus, such as for example a head-up display or a mobile terminal. On a transparent dual view display, for example, a person only sees the markers that are intended for him (for example if the viewing angle is different enough, for example greater than 90 degrees).

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a display device of a motor vehicle, the method comprising:
   capturing, by a first sensor, a viewing direction of a user situated in an inner space of the motor vehicle toward a display surface of the display device;
   capturing, by a second sensor, surroundings of the motor vehicle;
   determining, by a controller, the surroundings of the motor vehicle and a real object from among the surroundings, which are visible to the user through the display surface based on the captured viewing direction and the captured surroundings;
   based on the captured viewing direction, defining, by the controller, a display parameter of a digital image to be displayed on the display surface, the display parameter being defined according to an absolute visual form of the digital image such that a relative form of the digital image, brought about by a perspective from which the user is to view the digital image, is obtained based on the viewing direction of the user toward the absolute visual form of the digital image and corresponds to a form of the digital image that is intended to be undistorted to the user when the user views the digital image;
   adjusting the defined display parameter by changing a characteristic with respect to the real object such that the digital image is to be displayed on the display surface with the changed characteristic;
   generating, by the controller, the digital image based on the adjusted display parameter; and
   outputting the generated digital image on the display surface.

2. The method as claimed in claim 1, further comprising determining at least one of a contour and a color of the real object based on sensor data captured by the second sensor, wherein
   the characteristic to be changed includes at least one of a shape and a color of the digital image, and
   adjusting the defined display parameter comprises at least one of changing the shape of the digital image such that the digital image is to be displayed on the display surface with the changed shape to correspond to the contour of the real object, and changing the color of the digital image such that the digital image is to be displayed on the display surface with the changed color to provide a predetermined contrast between the color of the digital image and the color of the real object.

3. The method as claimed in claim 1, further comprising determining a point of intersection of a connecting line with the display surface, the connecting line being defined as a line between an eye of the user and the real object in the surroundings of the motor vehicle,
   wherein
   the characteristic to be changed includes a position of the digital image on the display surface, and
   adjusting the defined display parameter comprises changing the position of the digital image on the display surface when the user moves such that the digital image is shifted on the display surface according to the point of intersection of the connecting line with the display surface.

4. The method as claimed in claim 1, wherein the screen has self-illuminating pixels and the display device comprises the display surface.

5. The method as claimed in claim 1, further comprising:
   providing an interest profile of the user;
   determining a priority of the determined real object based on the interest profile of the user; and
   generating the digital image based on whether the determined priority has a predetermined value.

6. The method as claimed in claim 5, further comprising:
   determining a context of a behavior of the user based on at least one of: an item of content of websites visited by the user using a browser device, an item of content of speech of the user obtained using a speech recording and speech recognition device of the controller, an item of content of a digital survey, and a geographical location the user has visited; and
   generating the interest profile of the user based on the determined context.

7. The method as claimed claim 1, further comprising:
   determining the perspective from which the user views the digital image; wherein
   defining the display parameter is based on the determined perspective.

8. The method as claimed in claim 7, further comprising:
   capturing a curvature of the display surface; and
   defining the display parameter based on the captured curvature.

9. A control device for a motor vehicle, the control device comprising:
   a memory configured to store at least one instruction; and
   a controller configured to execute the at least one instruction stored in the memory to:
      receive a first signal from a first sensor which captures a viewing direction of a user situated in an inner space of the motor vehicle toward a display surface of the display device,
      receive a second signal from a second sensor which captures surroundings of the motor vehicle,
      determine the surroundings of the motor vehicle and a real object from among the surroundings, which are visible to the user through the display surface based on the received first signal and the received second signal,
      based on the captured viewing direction, define a display parameter of a digital image to be displayed on the display surface, the display parameter being defined according to an absolute visual form of the digital image such that a relative form of the digital image, brought about by a perspective from which the user is to view the digital image, is obtained based on the viewing direction of the user toward the absolute visual form of the digital image and corresponds to a form of the digital image that is intended to be undistorted to the user when the user views the digital image, adjust the defined display parameter by changing a characteristic with respect to the real object such that the digital image is to be displayed on the display surface with the changed characteristic, generate the digital image based on the adjusted display parameter, and output the generated digital image to be displayed on the display surface.

10. The control device as claimed in claim 9, wherein the characteristic to be changed includes at least one of a shape and a color of the digital image, and the controller is further configured to execute the at least one instruction stored in the memory to:

determine at least one of a contour and a color of the real object based on sensor data captured by the second sensor, and adjust the defined display parameter by at least one of changing the shape of the digital image such that the digital image is to be displayed on the display surface with the changed shape to correspond to the contour of the real object, and changing the color of the digital image such that the digital image is to be displayed on the display surface with the changed color to provide a predetermined contrast between the color of the digital image and the color of the real object.

11. The control device as claimed in claim 9, wherein the characteristic to be changed includes a position of the digital image on the display surface, and the controller is further configured to execute the at least one instruction stored in the memory to:

determine a point of intersection of a connecting line with the display surface, the connecting line being defined as a line between an eye of the user and the real object in the surroundings of the motor vehicle, and adjust the defined display parameter by changing the position of the digital image on the display surface when the user moves such that the digital image is shifted on the display surface according to the point of intersection of the connecting line with the display surface.

12. A motor vehicle, comprising:

a first sensor configured to capture a viewing direction of a user situated in an inner space of the motor vehicle toward a display surface of the display device;

a second sensor configured to capture surroundings of the motor vehicle;

a display device having a display surface; and a controller configured to:

determine the surroundings of the motor vehicle and a real object from among the surroundings, which are visible to the user through the display surface based on the viewing direction captured by the first sensor and the surroundings captured by the second sensor, based on the captured viewing direction, define a display parameter of a digital image to be displayed on the display surface, the display parameter being defined according to an absolute visual form of the digital image such that a relative form of the digital image, brought about by a perspective from which the user is to view the digital image, is obtained based on the viewing direction of the user toward the absolute visual form of the digital image and corresponds to a form of the digital image that is intended to be undistorted to the user when the user views the digital image, adjust the defined display parameter by changing a characteristic with respect to the real object such that the digital image is to be displayed on the display surface with the changed characteristic, generate the digital image based on the adjusted display parameter, and output the generated digital image to be displayed on the display surface.

13. The motor vehicle as claimed in claim 12, wherein the display surface includes a window pane of the motor vehicle.

14. The motor vehicle as claimed in claim 12, wherein the characteristic to be changed includes at least one of a shape and a color of the digital image, and the controller is further configured to:

determine at least one of a contour and a color of the real object based on sensor data captured by the second sensor, and adjust the defined display parameter by at least one of changing the shape of the digital image such that the digital image is to be displayed on the display surface with the changed shape to correspond to the contour of the real object, and changing the color of the digital image such that the digital image is to be displayed on the display surface with the changed color to provide a predetermined contrast between the color of the digital image and the color of the real object.

15. The motor vehicle as claimed in claim 12, wherein the characteristic to be changed includes a position of the digital image on the display surface, and the controller is further configured to:

determine a point of intersection of a connecting line with the display surface, the connecting line being defined as a line between an eye of the user and the real object in the surroundings of the motor vehicle, and adjust the defined display parameter by changing the position of the digital image on the display surface when the user moves such that the digital image is shifted on the display surface according to the point of intersection of the connecting line with the display surface.

* * * * *

UNITED STATES PATENT AND TRADEMARK OFFICE
CERTIFICATE OF CORRECTION

PATENT NO. : 10,607,526 B2
APPLICATION NO. : 16/317301
DATED : March 31, 2020
INVENTOR(S) : Joris Mertens et al.

Page 1 of 1

It is certified that error appears in the above-identified patent and that said Letters Patent is hereby corrected as shown below:

In the Claims

Column 14, Line 31, In Claim 7, after "claimed" insert -- in --.

Signed and Sealed this
Twenty-sixth Day of May, 2020

Andrei Iancu
*Director of the United States Patent and Trademark Office*